United States Patent

[11] 3,625,856

| [72] | Inventors | David P. Schaefer<br>Hinsdale;<br>James F. Kovarik, Berwyn, both of Ill. |
|---|---|---|
| [21] | Appl. No. | 90,147 |
| [22] | Filed | Nov. 16, 1970 |
| [45] | Patented | Dec. 7, 1971 |
| [73] | Assignee | Nalco Chemical Company<br>Chicago, Ill. |

[54] METHOD OF PRODUCING ORGANOSOLS
12 Claims, No Drawings

[52] U.S. Cl.................................................. 252/309, 252/8.6
[51] Int. Cl................................................... B01j 13/00

[50] Field of Search............................................ 252/309, 16, 28, 8.6

[56] References Cited
UNITED STATES PATENTS
3,312,630  4/1967  Vanik et al. ............... 252/309 X

*Primary Examiner*—John D. Welsh
*Attorneys*—John G. Premo, Charles W. Connors and Edward A. Ptacek ABSTRACT: A method of producing stable organosols, including pure metal oxide sols and coated silica sols, is accomplished by the means of an extraction reagent and an organic, water-immiscible solvent.

METHOD OF PRODUCING ORGANOSOLS

INTRODUCTION

Aqueous metal oxide sols and coated silica sols are known in the art. But in certain systems organosols are useful. For instance, in some treatments of textiles, organosols might be more useful than aqueous sols. Organosols are also useful as organic binders in refractories. Organosols of metal oxides or coated silica sols would have great utility as binders in refractories. Other uses are readily apparent to those skilled in the art.

However, efficient and simple methods of producing organosols from positively charged aqueous sols are not known in the art. Therefore, it would be a great advantage to the art if a method could be devised of efficiently producing organosols of metal oxide or coated metal oxide silica sols.

OBJECTS

It is an object of this invention to provide a method of producing stable organosols from positively charged aqueous sols. It is a further object of this invention to provide an efficient and simple method of producing organosols from aqueous metal oxide sols and coated silica sols. Further objects will be apparent to those skilled in the art.

THE INVENTION

A simple efficient method of producing organosols is disclosed. These organosols are produced from positively charged aqueous sols. The positively charged aqueous sols can be either pure metal oxide sols or coated silica sols. The particles of the aqueous sols must have an intrinsically positive charge.

The method of producing stable metal oxide organosols comprises the steps of:

1. Adding a sol in an aqueous solvent, wherein said sol has particles with an outer layer carrying an intrinsically positive charge, to an organic water-immisicible solvent containing an organic-soluble negatively charged extraction reagent. The sol can either be a pure metal oxide sol or a coated silica sol provided that the particles have a positive charge.
2. Thoroughly mixing the aqueous and the organic solvent. This will allow the extraction reagent which is negatively charged to extract the positively charged particles from the aqueous solvent.
3. Discarding the aqueous solvent after allowing the layers to separate. The use of a modifier such as 2-ethyl-hexanol has been found efficient in separating the layers.
4. Recovering the organic layer containing the organosol product.

Preferably, the sol is a coated silica sol having a coating of either iron, aluminum, or chromium oxide. Pure metal oxide sols or other coated silica sols could also be used. The final product should contain from about 5 to 60 percent by weight of particles, and preferably from 10 to 45 percent by weight.

Aqueous silica sols are well known in the art and are produced by a variety of methods. Aqueous coated silica sols may be produced according to U.S. Pat. No. 3,007,878. The process of making these coated silica sols consists of mixing an aquasol of colloidal silica particles with an aqueous solution of a basic salt of the metal to be coated on the silica particles. Vigorous agitation may be necessary to affect homogeneity.

Alumina coated silica sols may be produced according to U.S. Pat. No 3,252,915 which is incorporated here by reference. The method disclosed therein consists essentially of mixing an aqueous silica sol with sufficient basic aluminum halide to uniformly coat said silica particles with alumina to yield a coated sol product having an $Al_2O_3/SiO_2$ ratio ranging from 0.1 to 1.0 and contacting said coated sol in a single pass with a water-insoluble anion exchange resin which has as its exchangeable anion, an anion of a weak volatile inorganic acid to produce a stable, substantially salt-free alumina coated silica sol having a pH range from 4.5 to 6.5.

THE ORGANIC SOLVENT

The organic solvent that is used to prepare the organosol can be any organic solvent that is water immiscible. The organic solvent can be an aliphatic or an aromatic hydrocarbon. Illustrative of such solvents include but are not limited to hexane, benzene, carbon tetrachloride, heptane, kerosene, perchloroethylene, and methylisobutyl ketone. The ratio of the organic solvent to the aqueous solvent should range from about 20:80 to 80:20 by weight.

THE EXTRACTION REAGENT

The extraction reagent used in the organic solvent must be soluble in the organic solvent and have low solubility in the aqueous medium. It must also be a negatively charged species. Possible extraction reagents that could be used include organic soluble salts of alkyl acids such as phosphoric, phosphonic, thiophosphonic, sulfuric, and carboxylic acids, as well as of phenols and of polymeric materials containing any of the above-mentioned functional groups. An extraction reagent that has been found to be extremely useful is potassium di(2-ethyl-hexyl) phosphate. The extraction reagent should be present at a range of from 10.0 to 40.0 percent by weight based upon the organic solvent, preferably from 15.0 to 35.0 percent by weight and even more preferably from 25 to 35 percent by weight.

The amount of extraction reagent used depends on the particle size of the sol particles. The extraction reagent can vary from 10 to 300 percent by weight based on the sol. Preferably, from 25 to 100 percent of the extraction reagent is used based on the sol.

The sol can range up to 60 percent by weight. Much more dilute sols could also be used, such as 1 percent or even less. The particle size of the sol can range from 1 to 120 millimicrons.

The concentration of the extraction reagent should be maintained between controlled limits. A certain critical minimum amount of extraction reagent is needed to extract a given amount of sol. Below this minimum, gels or emulsions result. A slight excess of the extraction reagent normally does not cause serious problems though a large excess may lead to a gelling of the sol or more highly stabilized emulsions. As previously stated, the amount of extraction reagent needed depends on the surface area of the sol particles. For example, pure metal oxide sols with large surface areas require a large amount of extraction reagent for effective and complete extraction.

EXTRACTION

The aqueous and organic solvents are thoroughly agitated to allow the extraction reagent contained in the organic solvent to act on the positively charged metal oxide sols or coated silica particles of the aqueous solvent. Thus, the metal oxide particles or coated silica particles are removed from the aqueous solvent and go into the organic layer. The solvents are allowed to separate, so that the aqueous layer can be discarded and the organic layer recovered.

Liquid third phases may occur during the extraction, resulting in loss of the solvent and metal oxide sol. These third phases consist of relatively small layers of water saturated with the organic solvent and containing some of the sol. In order to prevent the losses which attend this formation of a third phase and also to simplify operations, a modifier may be added to the organic solvent. It has been found that long chain branched primary alcohols served best as modifiers in this process, eliminating entirely this undesirable formation. Less satisfactory in this respect are the more highly branched secondary alcohols, although caprylyl alcohol is effective. Among the primary alcohols, 2-ethylhexanol and 4-ethyloctanol are particularly useful. Other alcohols useful as modifiers include undecanol, diisobutylcarbinol, tetradecanol, and trimethylnonanol. The amount of modifier that is added varies with the organic reagent, its concentration, the alcohol used as modifier and the temperature at which the extraction is to be carried out. In general, however, it need not be greater than about 10 percent by volume. The third phase is most often found when the solvent is an aliphatic hydrocarbon such as kerosene, less often or not at all when the diluent is an aromatic hydrocarbon or a halogenated hydrocarbon. When use of an alcohol modifier is necessary, there is a tendency for some water to be lost from the sol solution by passage into the solvent layer; however, these losses can be readily compensated for by employing a more dilute sol.

It has also been found useful in some situations to incorporate a cosolvent, such as isopropanol. Other cosolvents could also be used.

Following are examples of the method of preparing organosols according to this disclosure. The aqueous-chromia-coated silica sol was prepared according to U.S. Pat. No. 3,007,878 using an aqueous silica sol having 34 percent silica as $SiO_2$, a pH of $3.1\pm0.5$, an average particle size of 16 to 22 millimicrons, average surface area of 135 to 190 $M^2/g.$, specific gravity at 68° F. of 1.230, viscosity at 77° F. of less than 5 cps. and a $Na_2O$ content of less than 0.01 percent by weight. The ratio of $SiO_2/Cr_2O_3$ was 7 percent. This means that the weight percent of $Cr_2O_3$ based on $SiO_2$ was 13.0 percent.

EXAMPLE I

A solution containing a potassium salt of di(2-ethylhexyl) phosphoric acid in hexane is prepared by vigorously agitating a solution containing 6 grams of di(2-ethylhexyl) phosphoric acid, 2 grams of 2-ethylhexanol, and 32 grams of hexane with a solution of 2 grams potassium hydroxide in 50 milliliters of water. The layers are allowed to separate. The hexane layer is then removed and comprises the organic solvent. This is mixed with 50 grams of an aqueous-chromia-coated silica sol having a solids concentration of 30 percent. The two layers are allowed to separate. The bottom layer is water clear while the upper hexane layer contains the green chromia-coated silica sol. The final product has 27.2 percent metal oxide and 38 percent total solids.

Electromicrographs of this organosol are almost identical with those of the original aquasols.

EXAMPLE II

The above procedure was repeated using only 3 grams of di(2-ethyl-hexyl) phosphoric acid, the sol immediately precipitated on mixing it with the hexane solution.

EXAMPLE III

The procedure of example I was followed exactly except substituting 60 grams of an aqueous-alumina-coated silica sol (solids content of 25 percent) for the chromia-coated silica sol. The product is fluid-alumina-coated organosol. The weight ratio of $SiO_2/Al_2O_3$ of the aqueous sol was 5.0. The final product has 27.2 percent metal oxide and 38 percent total solids.

EXAMPLE IV

This example shows the preparation of pure $Cr_2O_3$ sol in heptane. 101 grams of di(2-ethyl-hexyl) phosphoric acid in 350 grams of heptane containing 16 grams 2-ethylhexanol is mixed with a solution of 34.5 grams potassium hydroxide in 400 milliliters of water. After standing, the top heptane layer is drawn off and mixed with 490 grams of an aqueous $Cr_2O_3$ sol (8 percent $Cr_2O_3$). The two layers separate on standing. The upper heptane layer containing the pure green $Cr_2O_3$ sol is recovered as the product. The final product has 7 percent $Cr_2O_3$ and 25 percent total solids.

SUMMARY

In summary, a method of producing organosols by a simple and efficient procedure is disclosed. The method consists of adding an aqueous sol to an organic, water-immiscible solvent containing an extraction reagent. The sol particles are then extracted by thoroughly mixing the organic and aqueous solvents. The layers are separated. The aqueous layer is discarded and the organic layer is recovered as the organosol product.

What we claim and desire to be protected by Letters Patent is:

1. A method of producing stable positively charged organosols which comprises the steps of:
   A. adding a sol in an aqueous solvent, said sol having particles with an outer layer carrying an intrinsically positive charge, to an organic, water-immiscible solvent containing an organic-soluble, negatively charged extraction reagent;
   B. extracting the particles of the sol by thoroughly mixing the aqueous and organic solvents;
   C. allowing the solvents to separate into an aqueous and an organic layer;
   D. discarding the aqueous layer; and
   E. recovering the organic layer which is the organosol product.

2. The method of claim 1 in which the sol in the aqueous solvent is a positively charged metal oxide sol.

3. The method of claim 1 in which the sol in the aqueous solvent is a coated silica sol selected from the group consisting of iron, alumina, and chromium-oxide-coated silica sols.

4. The method of claim 1 in which the organic solvent is selected from the group consisting of hexane, benzene, kerosene, carbon tetrachloride, heptane, perchloroethylene, and methylisobutyl ketone.

5. The method of claim 1 in which the extraction reagent is potassium di(2-ethylhexyl) phosphate.

6. The method of claim 1 in which the extraction reagent is an organic-soluble salt of an alkyl acid, said acid being selected from the group consisting of phosphoric, phosphonic, thiophosphoric, sulfuric and carboxylic.

7. The method of claim 1 in which the extraction reagent ranges from 10.0 to 40.0 percent by weight based on the organic solvent.

8. The method of claim 1 in which the extraction reagent ranges from 15.0 to 35.0 percent by weight based on the organic solvent.

9. The method of claim 1 in which the extraction reagent ranges from 25.0 to 35.0 percent by weight based on organic solvent.

10. The method of claim 1 in which the sol in the aqueous solvent contains from 1 to 60 percent by weight of sol particles.

11. The method of claim 1 in which the ratio of the aqueous solvent to organic solvent ranges from 20:80 to 80:20 by weight.

12. The method of claim 1 in which the organosol product contains from 5 to 60 percent by weight of sol particles.

* * * * *